United States Patent
Su et al.

(10) Patent No.: US 10,908,125 B2
(45) Date of Patent: *Feb. 2, 2021

(54) APPARATUS AND METHOD FOR ARRANGING CONCRETE STRUCTURE SERVICE CONDITION OPTICAL FIBER ACOUSTIC EMISSION SENSING DEVICE

(71) Applicant: HOHAI UNIVERSITY, Nanjing (CN)

(72) Inventors: Huaizhi Su, Nanjing (CN); Meng Yang, Nanjing (CN); Qiangqiang Jia, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 154 days.

This patent is subject to a terminal disclaimer.

(21) Appl. No.: 16/312,300

(22) PCT Filed: Jan. 16, 2017

(86) PCT No.: PCT/CN2017/071293
§ 371 (c)(1),
(2) Date: Dec. 21, 2018

(87) PCT Pub. No.: WO2017/219666
PCT Pub. Date: Dec. 28, 2017

(65) Prior Publication Data
US 2019/0204277 A1    Jul. 4, 2019

(30) Foreign Application Priority Data
Jun. 22, 2016 (CN) .......................... 2016 1 0460930

(51) Int. Cl.
*G01N 29/14* (2006.01)
*G01N 29/24* (2006.01)

(52) U.S. Cl.
CPC ......... *G01N 29/14* (2013.01); *G01N 29/2418* (2013.01); *G01N 29/2462* (2013.01);
(Continued)

(58) Field of Classification Search
CPC .. G01N 29/14; G01N 29/2462; G01N 29/241; G01N 29/225; G01N 29/34; G01N 29/326
See application file for complete search history.

(56) References Cited

U.S. PATENT DOCUMENTS 4,487,068 A * 12/1984 Hawkins ................ G01N 29/14
73/159
5,381,695 A * 1/1995 Payne .................. B23D 79/023
73/643

(Continued)

*Primary Examiner* — Helen C Kwok
(74) *Attorney, Agent, or Firm* — CBM Patent Consulting, LLC

(57) ABSTRACT

The apparatus comprises a bottom plate, a first side plate (304), and a second side plate (305). The top of the first side plate is connected to the top of the second side plate by an arc-shaped fiber carrying channel (310, 311). A first arc-shaped cover (300) and a second arc-shaped cover (301) are hinged to the tops of the first side plate and the second side plate, respectively. A first arc-shaped pressing body (308) and a second arc-shaped pressing body (309) are fixedly connected to the lower end surfaces. A first sensing optical fiber (312) and a second sensing optical fiber (313) located in the arc-shaped fiber carrying channel are disposed below the first arc-shaped pressing body and the second arc-shaped pressing body respectively. The first arc-shaped cover is connected to the second arc-shaped cover by a locking apparatus.

8 Claims, 1 Drawing Sheet

(52) U.S. Cl.
CPC ............... *G01N 2291/0232* (2013.01); *G01N 2291/0258* (2013.01)

(56) References Cited

U.S. PATENT DOCUMENTS

| | | | | |
|---|---|---|---|---|
| 5,656,428 | A * | 8/1997 | McAllister | G01N 33/54373 435/6.11 |
| 5,804,725 | A * | 9/1998 | Posakony | G01N 29/2462 73/590 |
| 10,473,517 | B2 * | 11/2019 | Su | G02B 6/4471 |
| 10,520,473 | B2 * | 12/2019 | Su | G02B 6/022 |
| 10,520,475 | B2 * | 12/2019 | Su | G01N 29/34 |
| 2011/0288689 | A1 * | 11/2011 | Kageyama | G01N 29/2406 700/284 |
| 2012/0103098 | A1 * | 5/2012 | Laugharn, Jr. | B01F 11/02 73/644 |

* cited by examiner

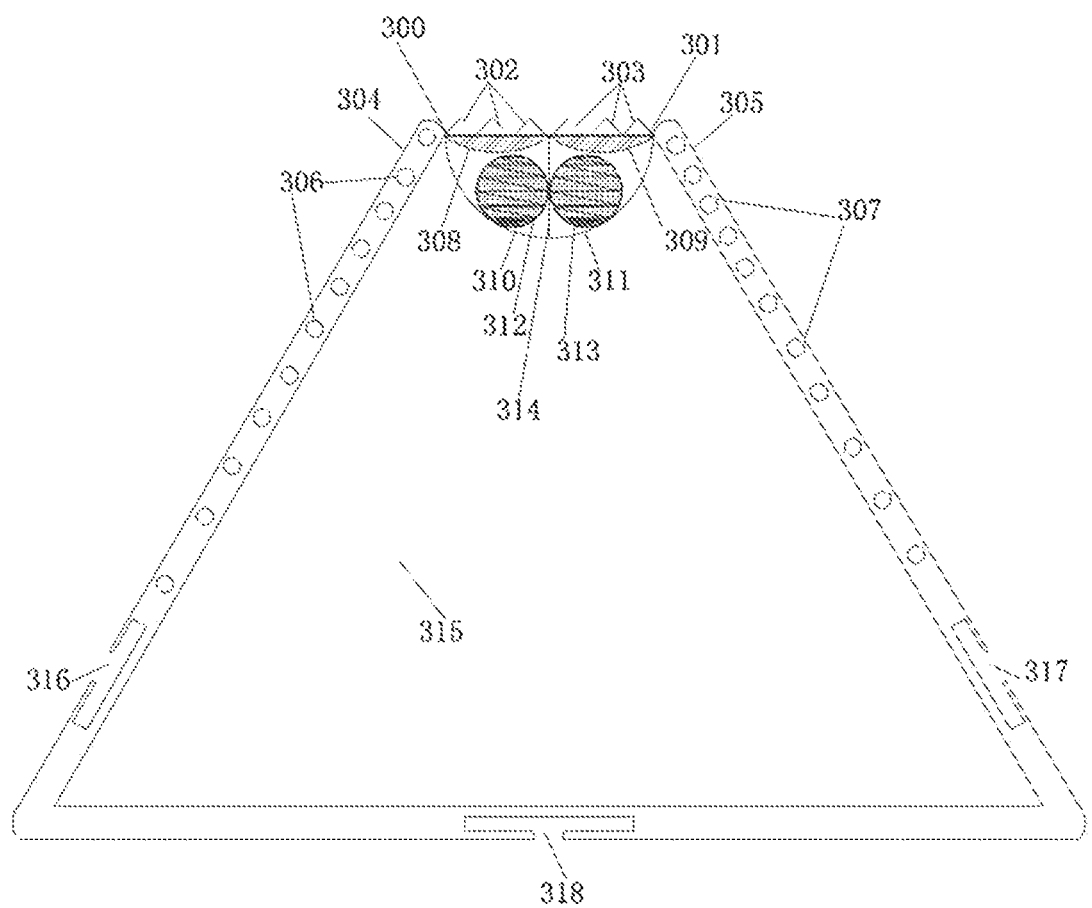

APPARATUS AND METHOD FOR ARRANGING CONCRETE STRUCTURE SERVICE CONDITION OPTICAL FIBER ACOUSTIC EMISSION SENSING DEVICE

TECHNICAL FIELD

The present invention relates to an apparatus and method for arranging a concrete structure service condition optical fiber acoustic emission sensing device, and belongs to the field of hydraulic structure health monitoring.

BACKGROUND ART

A sensing fiber has both "transmitting" and "sensing" functions. There are many types of sensors based on an optical fiber sensing technology. The same parameter can be measured by different types of sensors, but the core idea of the optical fiber sensing technology is to detect modulation of light from external parameters, which is classified into an intensity modulation type, a phase modulation type, a frequency modulation type, a wavelength modulation type and a polarization state modulation type according to the principle of modulation of light in an optical fiber. With the development of optical information and sensing technology, the optical fiber sensing technology has made great progress, and has advantages in sensing modes, sensing principles, signal detection and processing, etc., which are not available in conventional electrical sensors.

An acoustic emission technology is an advanced non-destructive testing technology. It obtains damage, fracture, deformation and other information inside a measured object by detecting and analyzing acoustic waves generated by the measured object. The technology is widely used in petroleum, aviation, civil engineering and other fields. An acoustic emission key component is an acoustic emission sensor for collecting and detecting acoustic waves. The conventional acoustic emission sensors are made of piezoelectric ceramic or piezoelectric crystal materials, which have the disadvantages such as poor anti-electromagnetic interference capability and short signal transmission. By the convergence of the optical fiber sensing technology and the acoustic emission technology, the disadvantages of poor anti-electromagnetic interference capability and short signal transmission can be avoided, and the optical fiber sensing technology can compensate for the capability of acoustic emission to monitor other information such as temperature. Therefore, the convergence of the optical fiber sensing technology and the acoustic emission sensing technology will greatly expand the capability of sensing and detecting a structural body, but how to better realize the collection and enhancement of acoustic waves in the acoustic emission technology and how to better arrange a sensing fiber have not been reported in the current field of convergence of the optical fiber sensing technology and the acoustic emission sensing technology.

SUMMARY OF THE INVENTION

Object of the Invention: In order to overcome the deficiencies in the prior art, the present invention provides an apparatus and method for arranging a concrete structure service condition optical fiber acoustic emission sensing device. By providing a plurality of first through holes and second through holes and a main co-cavity hole, acoustic wave propagation is increased, so that multilevel acoustic emission sources with multiple different durations are constructed, thus affecting multilevel multiple different durations of optical information in sensing optical fibers.

Technical Solution

In order to solve the foregoing technical problem, an apparatus for arranging a concrete structure service condition optical fiber acoustic emission sensing device of the present invention includes a bottom plate, and a first side plate and a second side plate fixedly connected to both sides of the bottom plate, wherein the top of the first side plate is connected to the top of the second side plate by an arc-shaped fiber carrying channel, and the bottom plate, the first side plate, the second side plate and the arc-shaped fiber carrying channel form a main co-cavity hole; a first arc-shaped cover and a second arc-shaped cover are hinged to the tops of the first side plate and the second side plate respectively; a first arc-shaped pressing body is fixedly connected to the lower end surface of the first arc-shaped cover, and a second arc-shaped pressing body is fixedly connected to the lower end surface of the second arc-shaped cover; a first sensing optical fiber located in the arc-shaped fiber carrying channel is disposed below the first arc-shaped pressing body, and a second sensing optical fiber is disposed below the second arc-shaped pressing body; the first arc-shaped cover is connected to the second arc-shaped cover by means of a locking apparatus; and the first arc-shaped cover and the second arc-shaped cover are rotated, the first sensing optical fiber and the second sensing optical fiber are pressed by the first arc-shaped pressing body and the second arc-shaped pressing body, and then the first arc-shaped cover and the second arc-shaped cover are locked by the locking apparatus.

Preferably, the first side plate is provided with a plurality of first through holes in the axial direction of the first sensing optical fiber.

Preferably, the second side plate is provided with a plurality of second through holes in the axial direction of the second sensing optical fiber.

Preferably, the first through holes are circular holes, the second through holes are hexagonal holes, and the number of the first through holes and the number of the second through holes are odd.

Preferably, the first arc-shaped cover and the second arc-shaped cover are provided with a lobe separately.

Preferably, the outer surfaces of the bottom plate, the first side plate and the second side plate are provided with an external groove separately.

Preferably, the first sensing optical fiber is separated from the second sensing optical fiber by a carrying channel diaphragm. The carrying channel diaphragm is mainly used to separate the first sensing optical fiber from the second sensing optical fiber, and serve as a supporting end of the first sensing optical fiber and the second sensing optical fiber, and the material of the carrying channel diaphragm is preferably a rigid plastic body.

An arrangement method corresponding to the apparatus for arranging a concrete structure service condition optical fiber acoustic emission sensing device as described above includes the following steps:

first, hinging a first arc-shaped cover to a first side plate, hinging a second arc-shaped cover to a second side plate, configuring sensing optical fibers used for monitoring as a first sensing optical fiber and a second sensing optical fiber, opening the first arc-shaped cover and the second arc-shaped cover, and placing the first sensing optical fiber and the second sensing optical fiber in an arc-shaped fiber carrying channel;

second, mounting and arranging the first side plate and the second side plate at an angle of 60° to a horizontal plane to form a main co-cavity hole, and checking whether a first through hole in the first side plate and a second through hole in the second side plate are blocked;

third, rotating the first arc-shaped cover to drive the movement of a first arc-shaped pressing body, pressing the first sensing optical fiber into the arc-shaped fiber carrying channel through a raised portion in the middle of the first arc-shaped pressing body, rotating the second arc-shaped cover to drive the movement of a second arc-shaped pressing body, and pressing the second sensing optical fiber into the arc-shaped fiber carrying channel through a raised portion in the middle of the second arc-shaped pressing body; and fourth, fixing the present apparatus into a structural body to be monitored from three positions through an external groove, and burying the present apparatus to complete a final arrangement.

In view of the disadvantages of convergence and sharing of an optical fiber sensing technology and an acoustic emission sensing technology, the present invention provides an apparatus for arranging a concrete structure service condition optical fiber acoustic emission sensing device, which compensates for the blank of the current research field. By constructing multiple co-acoustic cavities, acoustic wave propagation is increased, the monitoring accuracy and capability of distributed sensing fiber fibers are improved, an important guarantee is provided for layered multi-directional propagation of acoustic waves by arranging co-acoustic cavities with multiple sizes, different shapes and different positions, and an important support is effectively provided for the convergence of the optical fiber sensing technology and the acoustic emission sensing technology.

Advantageous Effect

According to the apparatus for arranging a concrete structure service condition optical fiber acoustic emission sensing device of the present invention, an apparatus for arranging a sensing optical fiber acoustic emission sensing device which integrates a main co-cavity hole, a co-cavity hexagonal hole and a co-cavity circular hole is firstly provided. By creatively providing multi-shaped cavity holes, large and small cavity holes and cavity holes at different positions in the space, multilevel acoustic emission sources with multiple different durations are constructed, acoustic wave propagation is increased, multilevel multiple different durations of optical information in sensing optical fibers are affected, and an important guarantee is provided for better monitoring the service condition of a structural body. The present apparatus is simple in operation, low in monitoring cost, complete in structure, and highly streamlined and automated, and is of great significance in application and promotion of an optical fiber sensing and acoustic emission convergence technology in practical engineering.

BRIEF DESCRIPTION OF THE DRAWINGS

FIG. 1 is a structure diagram of the present invention.
300, First arc-shaped cover; 301, second arc-shaped cover; 302, left outer lobe; 303, right outer lobe; 304, first side plate; 305, second side plate; 306, co-cavity circular hole; 307, co-cavity hexagonal hole; 308, first arc-shaped pressing body; 309, second arc-shaped pressing body; 310, first arc-shaped fiber carrying channel; 311, second arc-shaped fiber carrying channel; 312, first sensing optical fiber; 313, second sensing optical fiber; 314, carrying channel diaphragm; 315, main co-cavity hole; 316, first external groove; 317, second external groove; 318, bottom external groove.

DETAILED DESCRIPTION OF THE INVENTION

As shown in FIG. 1, an apparatus for arranging a concrete structure service condition optical fiber acoustic emission sensing device of the present invention includes a bottom plate, and a first side plate 304 and a second side plate 305 fixedly connected to both sides of the bottom plate. The top of the first side plate 304 is connected to the top of the second side plate 305 by an arc-shaped fiber carrying channel, the arc-shaped fiber carrying channel including a first arc-shaped fiber carrying channel 310 having a radian of $\pi/2$ and a second arc-shaped fiber carrying channel 311 having a radian of $\pi/2$. The bottom plate, the first side plate 304, the second side plate 305 and the arc-shaped fiber carrying channel form a main co-cavity hole 315. A first arc-shaped cover 300 and a second arc-shaped cover 301 are hinged to the tops of the first side plate 304 and the second side plate 305 respectively. A first arc-shaped pressing body 308 is fixedly connected to the lower end surface of the first arc-shaped cover 300, and a second arc-shaped pressing body 309 is fixedly connected to the lower end surface of the second arc-shaped cover 301. A first sensing optical fiber 312 located in the arc-shaped fiber carrying channel is disposed below the first arc-shaped pressing body 308, and a second sensing optical fiber 313 is disposed below the second arc-shaped pressing body 309. The first arc-shaped cover 300 is connected to the second arc-shaped cover 301 by means of a locking apparatus. The first arc-shaped cover 300 and the second arc-shaped cover 301 are rotated, the first sensing optical fiber 312 and the second sensing optical fiber 313 are pressed by the first arc-shaped pressing body 308 and the second arc-shaped pressing body 309, and then the first arc-shaped cover 300 and the second arc-shaped cover 301 are locked by the locking apparatus. The locking apparatus may be a connecting member such as a screw and a bolt, and may also be a buckle. The first arc-shaped pressing body 308 and the second arc-shaped pressing body 309 are strip-shaped bosses having a circular arc-shaped section. The right side of the second arc-shaped cover is adjacent to the second side plate. In order to produce a symmetrical acoustic emission effect, an odd number of co-cavity hexagonal holes are arranged at the upper end of the second side plate, and the number of the co-cavity hexagonal holes is 11. In order to make a difference from the co-cavity circular holes on the first side plate when propagating acoustic emission waves, the co-cavity hexagonal holes on the second side plate are regularly hexagonal. In order to realize the resonance of acoustic emission propagation at a better angle, information can be better transferred to the sensing optical fiber when resonating the co-cavity circular holes and the main co-cavity hole using the acoustic emission source.

The bottom end of a left outer lobe 302 shaped like a regularly triangular pyramid having three equilateral triangles with a side length of 2 cm is connected to the top end surface of the first arc-shaped cover 300 having a length of 5 cm and a width of 1 cm. The left outer lobe 302 is mainly used for increasing the friction with a structural body to be monitored when the present apparatus is buried, so as to enhance the synergistic deformation capability between the present apparatus and the structural body to be monitored. The first arc-shaped cover 300 can be rotated to drive the first arc-shaped pressing body 308 to move. The top end surface of the first arc-shaped pressing body 308 having a radian of $\pi/3$ is connected to the bottom end surface of the first arc-shaped cover 300 having a length of 5 cm and a width of 1 cm. The first arc-shaped fiber carrying channel 310 in the form of a circular arc having a radian of $\pi/2$ and a radius of 5 cm, the carrying channel diaphragm 314 having a length of 5 cm and the first arc-shaped pressing body 308 having a radian of $\pi/3$ form a triangular structure. The first arc-shaped pressing body 308 is connected to the first arc-shaped fiber carrying channel 310. The triangular structure can effectively fix a GJJV type tight buffered first sensing optical fiber 312. In this example, 11 co-cavity circular holes 306 having a diameter of 3 cm and a circular section are configured. The 11 co-cavity circular holes 306 are distributed on the first side plate 304 having a length of 20 cm and a width of 5 cm at an interval of 1 cm. An included angle between the first side plate 304 and a horizontal plane is 60°. The first side plate 304 is connected to the first arc-shaped fiber carrying channel 310. A first external groove 316 having an opening height of 2 cm and a width of 4 cm is formed in the lower middle part of the first side plate 304. The first external groove 316 is of an I-shaped opening, which can reduce interference at the time of burying the present apparatus.

In the present invention, the second arc-shaped cover 301 has a length of 5 cm and a width of 1 cm. A right outer lobe 303 is shaped like a triangular pyramid having three equilateral triangles with a side length of 2 cm. The second side plate 305 has a length of 20 cm and a width of 5 cm. The section of the co-cavity hexagonal hole 307 is an equilateral hexagon. A second external groove 317 has a side length of 1 cm, an opening height of 2 cm and a width of 4 cm. The second arc-shaped pressing body 309 has a radian of $\pi/3$. The second arc-shaped fiber carrying channel 311 is in the form of a circular arc having a radian of $\pi/2$ and a radius of 5 cm. A GJJV type tight buffered second sensing optical fiber 313 is provided. The GJJV type tight buffered second sensing optical fiber 313 is arranged in the second arc-shaped fiber carrying channel 311 in the form of a circular arc having a radian of $\pi/2$ and a radius of 5 cm. The top edge of the second arc-shaped pressing body 309 having a radian of $\pi/3$ is connected to the bottom end of the second arc-shaped cover 301 having a length of 5 cm and a width of 1 cm. The top end surface of the second arc-shaped cover 301 having a length of 5 cm and a width of 1 cm is connected to the bottom end surface of the right outer lobe 303 having three equilateral triangles with a side length of 2 cm. The right edge of the second arc-shaped cover 301 having a length of 5 cm and a width of 1 cm is connected to the second side plate 305 having a length of 20 cm and a width of 5 cm. The second arc-shaped cover 301 having a length of 5 cm and a width of 1 cm serves as a carrying body of the right outer lobe 303. The second arc-shaped pressing body 309 having a radian of $\pi/3$ is also pressed into the second arc-shaped fiber carrying channel 311. The GJJV type tight buffered second sensing optical fiber 313 is pressed at a position close to the carrying channel diaphragm by the raised arrangement of the second arc-shaped pressing body 309. The second side plate 305 having a length of 20 cm and a width of 5 cm is sequentially provided, from top to bottom, with equally-sized co-cavity hexagonal holes 307 having an equilateral hexagonal section and a side length of 1 cm. The upper end of the second side plate 305 is provided with 11 co-cavity hexagonal holes 307. An included angle between the second side plate 305 and a horizontal plane is 60°. The second external groove 317 and a bottom external groove 318 having an opening height of 1 cm and a width of 5 cm are of I-shaped openings, which can reduce interference at the time of burying the present apparatus.

An operation method of the apparatus for arranging a concrete structure service condition optical fiber acoustic emission sensing device as described above includes the following steps:

(1) Determine the Number of Adopted Apparatuses and the Length of Distributed Sensing Optical Fibers In this embodiment, a region having a water-facing surface of 150 m×100 m in a construction process of a concrete dam in Northwest China is selected, and its circumference is 500 m. Considering possible bending and the use of a lead wire, the length of a final GJJV type tight buffered sensing optical fiber is determined to be 600 m. Based on the thickness (2 m) of an adopted apparatus for arranging a concrete structure service condition optical fiber acoustic emission sensing device, and the range of parts that need to be monitored in practical engineering, it is finally determined that 50 apparatuses for arranging a concrete structure service condition optical fiber acoustic emission sensing device are selected. Each apparatus for arranging a concrete structure service condition optical fiber acoustic emission sensing device is protectively buried by a rubber tube. In order to better describe the operation details of the present apparatus, the operation of one of the apparatuses is preferred for detailed description.

(2) Assemble a First Arrangement Module and a Second Arrangement Module

The first side plate 304 having a length of 20 cm and a width of 5 cm and the second side plate 305 having a length of 20 cm and a width of 5 cm are mounted and arranged at an angle of 60° to a horizontal plane to form a main co-cavity hole 315. It is checked one by one whether 11 co-cavity circular holes 306 having a diameter of 3 cm and a circular section on the first side plate 304 and 11 co-cavity hexagonal holes 307 having an equilateral hexagonal section and a side length of 1 cm on the second side plate 305 are blocked. If they are blocked or obstructed, a dredge process is required. The first arc-shaped cover 300 and the second arc-shaped cover 301 are opened, and the first sensing optical fiber 312 and the second sensing optical fiber 313 are placed in the first arc-shaped fiber carrying channel 310 and the second arc-shaped fiber carrying channel 311.

(3) Close the Apparatus and Perform Initial Operation Debugging

By rotating the first arc-shaped cover 300 having a length of 5 cm and a width of 1 cm and the second arc-shaped cover 301 having a length of 5 cm and a width of 1 cm, the first arc-shaped pressing body 308 having a radian of $\pi/3$ and the second first arc-shaped pressing body 309 having a radian of $\pi/3$ can be driven to move. The first arc-shaped pressing body 308 having a radian of $\pi/3$, the first arc-shaped fiber carrying channel 310 in the form of a circular arc having a radian of $\pi/2$ and a radius of 5 cm and the carrying channel diaphragm 314 having a length of 5 cm form a triangular arrangement form. The second arc-shaped pressing body 309 having a radian of $\pi/3$, the second arc-shaped fiber carrying channel 311 in the form of a circular arc having a radian of $\pi/2$ and a radius of 5 cm and the carrying channel diaphragm 314 having a length of 5 cm form a triangular arrangement form. The first arc-shaped pressing body 308 having a radian of $\pi/3$ and the second arc-shaped pressing body 309 having a radian of π/3 are each of a middle raised structure. The GJJV type tight buffered first sensing optical fiber 312 and the GJJV type tight buffered second sensing optical fiber 313 can be fixed in a non-rigid manner. The combined form of triangular arrangement can transfer information to the first sensing optical fiber 312 and the second sensing optical fiber 313 when resonating the co-cavity circular holes 306, the co-cavity hexagonal holes 307 and the main co-cavity hole 315 using an acoustic emission source. The first sensing optical fiber 312 and the second sensing optical fiber 313 are connected to an instrument to be monitored for initial debugging, and the operation condition of the apparatus is checked.

(4) Bury the Apparatus to Complete Arrangement

A part that can be fixed in a structural body to be monitored is selected. In this example, it is attached to a steel structure. Therefore, the first external groove 316 having an opening height of 2 cm and a width of 4 cm, the second external groove 317 having an opening height of 2 cm and a width of 4 cm and the bottom external groove 318 having an opening height of 1 cm and a width of 5 cm respectively pass through reinforcing bar members in the structural body to be monitored. The apparatuses are sequentially arranged and mounted in an order from near to far, from straight to bending, and from up to down. After all the apparatuses have been arranged, they are buried to complete a final arrangement.

The above description is only a preferred implementation of the present invention. It should be noted that a person of ordinary skill in the art can also make several improvements and modifications without departing from the principles of the present invention. These improvements and modifications should also be considered as the scope of protection of the present invention.

What is claimed is:

1. An apparatus for arranging a concrete structure service condition optical fiber acoustic emission sensing device, comprising a bottom plate, and a first side plate and a second side plate fixedly connected to both sides of the bottom plate, wherein a top of the first side plate is connected to a top of the second side plate by an arc-shaped fiber carrying channel, and the bottom plate, the first side plate, the second side plate and the arc-shaped fiber carrying channel form a main co-cavity hole; a first arc-shaped cover and a second arc-shaped cover are hinged to the tops of the first side plate and the second side plate respectively; a first arc-shaped pressing body is fixedly connected to a lower end surface of the first arc-shaped cover, and a second arc-shaped pressing body is fixedly connected to a lower end surface of the second arc-shaped cover; a first sensing optical fiber located in the arc-shaped fiber carrying channel is disposed below the first arc-shaped pressing body, and a second sensing optical fiber is disposed below the second arc-shaped pressing body; the first arc-shaped cover is connected to the second arc-shaped cover by means of a locking apparatus; and the first arc-shaped cover and the second arc-shaped cover are rotated, the first sensing optical fiber and the second sensing optical fiber are pressed by the first arc-shaped pressing body and the second arc-shaped pressing body, and then the first arc-shaped cover and the second arc-shaped cover are locked by the locking apparatus; wherein the first and second sensing optical fibers are capable of detecting pre-determined type of vibration.

2. The apparatus for arranging a concrete structure service condition optical fiber acoustic emission sensing device according to claim 1, wherein the first side plate is provided with a plurality of first through holes in an axial direction of the first sensing optical fiber.

3. The apparatus for arranging a concrete structure service condition optical fiber acoustic emission sensing device according to claim 2, wherein the second side plate is provided with a plurality of second through holes in the axial direction of the second sensing optical fiber.

4. The apparatus for arranging a concrete structure service condition optical fiber acoustic emission sensing device according to claim 3, wherein the first through holes are co-cavity circular holes, a section of the co-cavity circular holes being a circular hole; the second through holes are co-cavity hexagonal holes, a section of the co-cavity hexagonal holes being a hexagonal hole; and a number of the first through holes and a number of the second through holes are odd.

5. The apparatus for arranging a concrete structure service condition optical fiber acoustic emission sensing device according to claim 4, wherein the first arc-shaped cover and the second arc-shaped cover are provided with a lobe separately.

6. The apparatus for arranging a concrete structure service condition optical fiber acoustic emission sensing device according to claim 5, wherein outer surfaces of the bottom plate, the first side plate and the second side plate are provided with an external groove separately.

7. The apparatus for arranging a concrete structure service condition optical fiber acoustic emission sensing device according to claim 6, wherein the first sensing optical fiber is separated from the second sensing optical fiber by a carrying channel diaphragm.

8. A method for arranging a concrete structure service condition optical fiber acoustic emission sensing device according to claim 7, comprising the following steps:

first, hinging a first arc-shaped cover to a first side plate, hinging a second arc-shaped cover to a second side plate, configuring sensing optical fibers used for monitoring as a first sensing optical fiber and a second sensing optical fiber, opening the first arc-shaped cover and the second arc-shaped cover, and placing the first sensing optical fiber and the second sensing optical fiber in an arc-shaped fiber carrying channel;

second, mounting and arranging the first side plate and the second side plate at an angle of 60° to a horizontal plane to form a main co-cavity hole, and checking whether a first through hole in the first side plate and a second through hole in the second side plate are blocked;

third, rotating the first arc-shaped cover to drive a movement of a first arc-shaped pressing body, pressing the first sensing optical fiber into the arc-shaped fiber carrying channel through a raised portion in a middle of the first arc-shaped pressing body, rotating the second arc-shaped cover to drive a movement of a second arc-shaped pressing body, and pressing the second sensing optical fiber into the arc-shaped fiber carrying channel through a raised portion in a middle of the second arc-shaped pressing body; and fourth, fixing a present apparatus into a structural body to be monitored from three positions through an external groove, and burying the present apparatus to complete a final arrangement.

* * * * *